Jan. 26, 1960 E. J. BRODERICK ET AL 2,922,255
MOLD APPARATUS FOR CASTING GLASS
Filed March 22, 1956

Inventors
Edward J. Broderick,
Lionel J. Doucette,
by Gilbert P. Tarleton
Their Attorney.

United States Patent Office 2,922,255
Patented Jan. 26, 1960

2,922,255

MOLD APPARATUS FOR CASTING GLASS

Edward J. Broderick and Lionel J. Doucette, Pittsfield, Mass., assignors to General Electric Company, a corporation of New York Application March 22, 1956, Serial No. 573,144

3 Claims. (Cl. 49—65)

The present invention relates to the making of glass products, and more particularly concerns the casting of shaped glass articles and a mold arrangement used in the casting process.

Heretofore, metal molds have been most commonly used in the glass-making art, either for stationary pressing and blowing or for centrifugal casting methods. The metal molds, however, have certain drawbacks. For large glass castings having an axial cavity a steel mold is extremely expensive, particularly in the case of centrifugal casting since elaborate and costly apparatus is required to properly rotate the metal mold. Alternatively, the use of a metal core in stationary casting processes is often not satisfactory because of the difficulties encountered due to unequal contraction of the metal core and the cast glass, and the problem of removing the core without breaking the glass.

It is an object of the invention to provide an improved mold structure of the shell mold type which is particularly adapted for casting glass, and especially hollow glass products.

Other objects and advantages will become apparent from the following description and the appended claims.

In accordance with the broad aspects of the invention, the present process of casting glass comprises pouring molten glass into a mold composed of granules of inorganic material bonded together with a thermosetting resin binder, and separating the cast glass from the mold after the glass has sufficiently cooled and solidified.

The mold used in accordance with the invention is a sand-resin shell mold of a type already known in the metal casting field. Satisfactory results would not normally have been expected in the use of such molds in casting glass for various reasons, such as the possibility of reaction of the molten glass composition with the sand particles of the mold, the more critical heat transfer problems involved in casting glass, and the risk of contamination of the glass with the combustion products of the resin binder of the mold, as well as other factors. We have found, however, that very good results are obtained by the present glass-casting method using a sand-resin mold, and especially when certain modifications are made in the mold composition and arrangement as hereinafter disclosed.

The invention will be better understood from the following description taken in conjunction with the accompanying drawing, in which.

Figure 1:
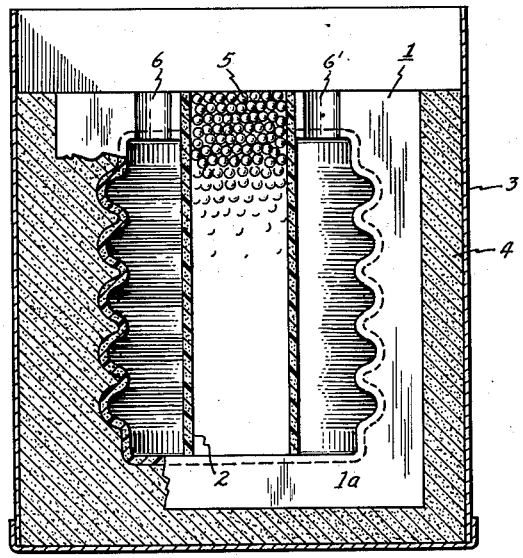
Fig. 1 is a sectional view of a mold arrangement used in accordance with the present invention, the inner mold shell component being viewed as indicated by line 1—1 of Fig. 2.
Figure 2:
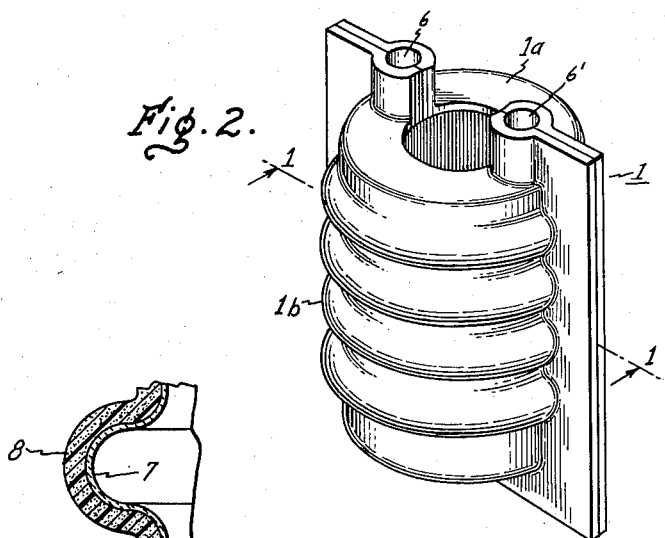
Fig. 2 is a perspective view of the mold shell shown in Fig. 1 with core omitted.

Referring now to the drawing, the mold apparatus used in casting glass in accordance with the present process comprises an outer flanged composite mold shell 1 composed of portions 1a and 1b of suitable configuration held together temporarily or permanently by any suitable binder or joining means, and a central tubular core 2 coaxial therewith. The shell mold 1 and core 2 are composed of a sand-resin mixture, and the illustrated embodiment are shaped to form a hollow cast glass electrical insulator of known type. The shell mold 1 is arranged with a suitable container 3 such as a steel box and with heat-insulating backing material 4 such as coarse sand and the like firmly packed between the mold 1 and the walls of container 3. The core 2 is filled with steel balls or shot 5, of the order of ⅛ inch diameter, or other heat conductive material which serves to absorb heat from the molten cast glass in the mold. The shell mold 1 is formed with passages 6, 6' through which the molten glass is poured into the mold cavity during the casting process.

The usual composition of the sand-resin mold and core is a mixture of sand and a thermosetting synthetic resin, the latter being preferably a two-stage phenolic resin such as phenol-formaldehyde with a deficiency of formaldehyde to prevent complete polymerization in the first stage. Hexamethylene tetramine is added to the powdered resin to provide ammonia for catalysis and formaldehyde for completion of the polymerization which takes place in the heating step in the shell-making process. While various types of phenolic resins may be used depending on such factors as the desired flow characteristics and speed of setting of the resin, the finely powdered phenolics of the two-stage type have been found more satisfactory for general application. In this type of compound the initially solid resin fuses before it hardens to bind the sand. Resins of this type are highly uniform and capable of reproducing complex configurations. Examples of other types of resins which may be used are urea-formaldehyde and melamine formaldehyde resins, or a mixture of the various resins. The resin component of the sand-resin mixture may suitably have a fineness of about 200 mesh.

The sand used in making the shell mold may be of the usual types of foundry sand having a high silica content, and generally being free from clay and organic materials. Other types of inorganic granules which may be used are zirconite, magnesuim oxide and graphitic particles.

In general, the resin proportion in the mixture is about 3–20% by weight, with the remainder being sand. The size of the sand particles is of importance for several reasons. The sand should be fine enough to produce the desired smoothness of glass surface. However, too fine a sand requires an excessive amount of resin binder due to the increased surface area of the sand, and this is undesirable because of the higher cost of the resin component, the lower strength of the mold when the resin has burned away in the casting process, and the greater volumes of gas produced by combustion of the resin. Preferably, the sand size ranges between 140 and 230 mesh, with the smaller size sand generally being used with the larger resin content and larger size sand particles used with the lesser resin contents.

Examples of resin-sand mixtures which have produced very satisfactory results in the present glass-casting process are as follows in percent by weight:

*Example I*

| | Percent |
|---|---|
| Sand (5 screen) | 72.1 |
| Sand, 230 mesh | 14.4 |
| Resin, phenol-formaldehyde 2-stage | 13.5 |

The typical 5 screen sand is composed of various sizes of said particles as follows:

15% retained by 100 mesh screen

30% retained by 140 mesh screen
25% retained by 200 mesh screen
15% retained by 270 mesh screen
15% passed by 270 mesh screen

*Example II*

| | Percent |
|---|---|
| Sand (5 screen as in Example I) | 75 |
| Sand, 230 mesh | 15 |
| Resin, phenol-formaldehyde 2-stage | 10 |

It has been found that the addition of 230 mesh sand, as in the above examples, increases the smoothness of the shell surface without unduly increasing the total surface area of the sand particles.

In making the shell mold, a sand-resin blend such as in the above mixtures is applied to a steel model of the casting required, the steel model having been heated to 320° C. and having an enclosure around its surfaces in which the blend is poured so as to come in contact with the enclosed hot surfaces. After 20–30 seconds, the excess sand-resin mixture is removed and a coating ⅛ inch to ⅜ inch in thickness remains on the hot steel surface of the model. The steel model with coating thereon is then placed in an oven at 320° C. for 5 to 7 minutes to complete the polymerization of the resin binder. The resultant shell is hard and smooth, and is easily removed from the steel model. A pair of such shells, such as shown in the drawing, are joined together by any suitable means to form the outer composite mold, and a cylindrical hollow core of similar composition is placed inside coaxially therewith to form the completed shell mold as shown in Fig. 1.

The shell thus formed is placed in a steel container, as illustrated in Fig. 1, with the intervening space being occupied by a backing material such as coarse sand, gravel or other heat-retaining or insulating material, the size of the particles being preferably about 8–20 mesh. The backing insulation, by retaining to a substantial degree the heat from the cast glass, avoids rapid cooling of the glass and the consequent strains which would otherwise result. Also, such retention of the heat improves the flow and filling characteristics of the glass. The provision of heat insulating backing material as described and shown is in contrast to the use of steel shot for backing material in the ordinary foundry practice where it is desired to add strength to the shell mold and to remove the heat as quickly as possible from the cast metal.

The steel shot 5 used within the core of the present mold, however, is considerably more heat absorbent than the backing material 4 and has been found desirable in order to withdraw more quickly the greater amount of heat concentrated in the center of the mold during the casting process. By this means, a proper balance and uniformity is achieved in the rate of cooling of the glass in all parts of the mold to avoid strains in the molded glass, to eliminate possible localized failure of the shell mold structure and to allow the glass to flow freely. Such control of the heat is further desirable in order to ensure that adequate amounts of heat are retained long enough to keep the glass which is introduced into the mold in molten condition until all of the glass material has been poured in. Otherwise, premature solidification of the glass in parts of the mold may prevent proper flow of the molten glass into the mold configuration, especially where intricate patterns and constricted passages are involved.

It may in certain circumstances, depending, for example, on the shape of the mold, the glass composition, the temperature of the molten glass, and other factors, be found desirable to use for the backing material 4 a mixture of heat-conductive material (e.g., steel shot) and heat-insulating material (e.g., coarse sand) to attain the proper balance in the rate of cooling of the mold and the glass mass therein.

It will be noted that the outer surface of the shell mold shown in the drawing follows the configuration of the inner surface, and this form has been found preferable in further promoting the uniform withdrawal of heat from the cast glass. Where the outer surface is made straight and not correspondingly shaped to the inner surface, it has been found that the greater amount of heat retained by the inwardly projecting mold portions unduly delayed solidification of the corresponding portions of the cast glass as compared to adjacent glass portions, with the result that, especially in tall glass articles such as insulators for bushings, an appreciable bending or distortion occurred in the cast glass article.

Figure 3:
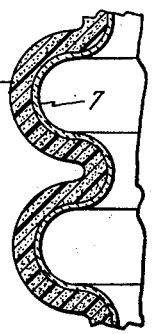
Fig. 3 is an enlarged sectional detail of the mold shell of Figs. 1 and 2 showing a modification thereof.

While satisfactory results have been obtained in casting glass in the shell molds constructed merely of the sand-resin mixture as described, further improvement has been achieved by the provision of particular coatings on the surfaces of the mold in contact with the cast glass. Fig. 3 of the drawing shows a modification of the shell mold wherein a coating 7 is provided on the surface of the mold shell 8, it being understood that a similar coating is usually applied to the outer surface of the central core portion 2. It has been found that by coating the mold surfaces as shown with a layer of non-flammable inorganic refractory material having a particle size less than 270 mesh in a suitable suspension vehicle such as clay and water or sodium silicate, a smoother surface, good flow of the molten glass, and even heat distribution is achieved. The refractory coating considerably retards burning and avoids flaming of the resin component of the sand-resin mold and thereby prolongs the life and strength of the mold. Also, the coating allows more resin to be used, without either decreasing the strength of the mold structure, or increasing the combustion products during casting. Further, such a coating avoids the appearance inside the glass of traces of carbon which are formed by the burning of the resin component.

Coating compositions which have been found especially suitable in accordance with the invention are as follows in percent by weight:

*Example III*

| | Percent |
|---|---|
| Clay | 19.0 |
| Alumina, hydrated | 19.5 |
| Flint | 19.5 |
| Water | 42.0 |

In the above composition the hydrated alumina and flint are used as filler material. The clay may be of any suitable type such as white clay.

*Example IV*

| | Percent |
|---|---|
| Clay | 12.0 |
| Flint | 54.0 |
| Water | 33.0 |
| Soda ash | 0.5 |
| Sodium silicate | 0.5 |

The composition of Example IV is preferable in having a lower water content, this being desirable to avoid excessive wetting of the mold. The coatings formed by above compositions have very low thermal expansion characteristics and will not shrink or crack. The coating mixtures may be applied to the mold surface by spraying, painting, dipping or in any other suitable manner, and in certain cases the use of a wetting agent may be found to assist in the application of the coating mixture on the mold surface.

Various types of glass composition may be used in obtaining cast glass articles in accordance with the invention. For molds with intricate shapes it is desirable to use a glass having high fluidity at the casting temperature. Types of glass composition adapted for casting insulators for bushings using the present process are those disclosed, for example, in Patents 2,478,626—Grigorieff and 2,513,958—Omley. In general, it is preferable to use the so-called "hard" types of glass, which have a shorter range between the softening and working temperatures, for example, 850–1250° C., as compared to the "soft" glasses where the temperature range between softening and working is greater, e.g., between 640–1200° C. Since the molten hard glass in cooling reaches its solidifying temperature more quickly than the soft glass, the risk of premature breakdown of the sand-resin mold due to prolonged burning of the resin is avoided, and also the chance of contaminating the glass by the loosened sand is largely eliminated. Further, glasses with comparatively high fluidity at their casting temperature, such as in certain hard glasses, make possible a stream of glass of small diameter, thus facilitating and accelerating the filling of the mold through the narrow mold passages.

In a typical casting process in accordance with the invention, a stream of glass at 1150–1250° C. is poured into the shell mold through the narrow passages to the upper rim of the passages so as to form two columns. The columns thus provided take up the normal shrinkage of the glass to insure a complete forming of the insulator bushing or other cast article. After chilling the whole mass to a temperature below the softening temperature but above the annealing temperature, the glass insulator bushing is easily removed from the mold apparatus since the sand-resin shell crumbles away readily. The glass casting is cleared of the remaining burned out shell and insulating backing and is then placed in the annealing lehr. Thereafter the glass is annealed and further treated in accordance with the known art.

The process of casting glass and the shell mold structure and arrangement as described have several advantages over the conventional glass-casting procedures which utilize metal molds. Greater economy is afforded especially where large casting is required, due particularly to the low cost of the shell mold, and the lighter weight of the sand-resin mold considerably facilitates handling. In the shell mold process a core may be used to form hollow articles, and there is thus avoided the necessity for centrifugal casting as required in the usual casting processes. Also, since the shell mold for the most part readily crumbles away and is easily separated from the glass after the glass solidifies and cools, the removal of the glass from the mold is considerably facilitated, and it is thus possible to cast glass articles having undercut portions which would otherwise firmly engage the corresponding metal mold surface making it impossible to separate the cast article from the mold without breaking or cracking the glass portion so engaged.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A mold apparatus for casting glass comprising, in combination, a container, a shell mold composed of a sand synthetic resin mixture and comprising an outer shell portion and an inner hollow core portion, said shell mold being arranged in said container spaced from the walls thereof, heat-insulating material arranged in the space between said container and said shell mold, and stationary heat-conductive material arranged in the interior of said hollow core portion for readily absorbing heat from glass cast into said mold.

2. A mold apparatus for casting glass comprising, in combination, a container, a shell mold composed of a sand-resin mixture and comprising an outer shell portion and an inner hollow core portion, said shell mold being arranged in said container spaced from the walls thereof, coarse refractory heat-insulating material arranged in the space between said container and said shell mold, and metal shot arranged in the interior of said hollow core portion.

3. A mold apparatus for casing glass comprising, in combination, a container, a shell mold composed of 80–90% by weight of sand granules of 140–230 mesh bonded together with 3–20% by weight of a thermosetting resin binder and comprising an outer shell portion and an inner hollow core portion defining a mold cavity there between, said shell mold having a non-flammable, refractory coating on the surfaces thereof defining said mold cavity and being arranged in said container spaced from the walls thereof, coarse refractory heat-insulating material arranged in the space between said container and said shell mold, and metal shot arranged in the interior of said hollow core portion.

References Cited in the file of this patent

UNITED STATES PATENTS

| | | |
|---|---|---|
| 1,615,750 | Fulcher | Jan. 25, 1927 |
| 2,023,044 | Easter | Dec. 3, 1935 |
| 2,045,716 | McCauley | June 30, 1936 |
| 2,772,453 | Beech | Dec. 4, 1956 |
| 2,772,458 | Henry | Dec. 4, 1956 |

OTHER REFERENCES

FIAT Final Report No. 1168, "The C Process of Making Molds and Cores for Foundry Use," by William W. McCulloch, Office of Technical Services, May 30, 1947.

UNITED STATES PATENT OFFICE

CERTIFICATE OF CORRECTION

Patent No. 2,922,255            January 26, 1960

Edward J. Broderick et al.

It is hereby certified that error appears in the printed specification of the above numbered patent requiring correction and that the said Letters Patent should read as corrected below.

Column 6, line 27, for "casing" read -- casting --.

Signed and sealed this 23rd day of August 1960.

(SEAL)
Attest:

KARL H. AXLINE
Attesting Officer

ROBERT C. WATSON
Commissioner of Patents